(12) United States Patent
Fujita et al.

(10) Patent No.: US 10,227,229 B2
(45) Date of Patent: Mar. 12, 2019

(54) METHOD FOR MANUFACTURING HEADREST, AND HEADREST

(71) Applicant: Delta Tooling Co., Ltd., Hiroshima (JP)

(72) Inventors: Etsunori Fujita, Higashihiroshima (JP); Kazuhiro Takenaka, Hiroshima (JP); Kazunari Yasui, Hiroshima (JP); Shigeki Wagata, Hiroshima (JP)

(73) Assignee: Delta Tooling Co., Ltd., Hiroshima-shi (JP)

( * ) Notice: Subject to any disclaimer, the term of this patent is extended or adjusted under 35 U.S.C. 154(b) by 30 days.

(21) Appl. No.: 15/545,565

(22) PCT Filed: Jan. 22, 2016

(86) PCT No.: PCT/JP2016/051870
§ 371 (c)(1),
(2) Date: Jul. 21, 2017

(87) PCT Pub. No.: WO2016/117687
PCT Pub. Date: Jul. 28, 2016

(65) Prior Publication Data
US 2018/0029876 A1 Feb. 1, 2018

(30) Foreign Application Priority Data
Jan. 23, 2015 (JP) .................... 2015-011857

(51) Int. Cl.
| | |
|---|---|
| *B60N 2/48* | (2006.01) |
| *B68G 7/06* | (2006.01) |
| *B60N 2/80* | (2018.01) |
| *A47C 7/38* | (2006.01) |
| *B60N 2/879* | (2018.01) |

(Continued)

(52) U.S. Cl.
CPC .............. *B68G 7/06* (2013.01); *A47C 7/38* (2013.01); *B60N 2/80* (2018.02); *B60N 2/879* (2018.02); *B60N 2/888* (2018.02); *B68G 7/05* (2013.01)

(58) Field of Classification Search
CPC ...... B60N 2/80; B60N 2/7017; B60N 2/2851; B60N 2/885; B60R 16/037
See application file for complete search history.

(56) References Cited

U.S. PATENT DOCUMENTS 3,792,754 A * 2/1974 Hanson ................ H04R 5/0335
181/130
4,038,499 A * 7/1977 Yeaple .................. H04R 5/023
381/301

(Continued)

FOREIGN PATENT DOCUMENTS

| JP | 4-2608 U | 1/1992 |
|---|---|---|
| JP | 9-85755 A | 3/1997 |

(Continued)

OTHER PUBLICATIONS

International Search Report dated Apr. 26, 2016, in PCT/JP20106/051870 filed Jan. 22, 2016.

*Primary Examiner* — Shin H Kim
(74) *Attorney, Agent, or Firm* — Oblon, McClelland, Maier & Neustadt, LLP

(57) ABSTRACT

A headrest in which a pad layer is integrally formed, including a portion with a narrow gap, between a mechanism having various types of incorporated functions and a skin member. A shock absorbing member that is an injection-passage-forming member having a foaming raw material injection passage formed so as to run substantially along a direction that is the vertical direction of the headrest in orientation of when a seat is attached, is set in the inside of a skin member, and a foaming raw material for forming the (Continued)

pad layer is injected through the foaming raw material injection passage. The configuration preferably causes the foaming raw material to spread by the foaming start time, as the foaming raw material spreads to the outer side of the headrest, that is, to the inner surface of the skin member, where the pad layer is required to be formed.

14 Claims, 12 Drawing Sheets

(51) Int. Cl.
*B60N 2/888* (2018.01)
*B68G 7/05* (2006.01)

(56) References Cited

U.S. PATENT DOCUMENTS

| | | | | |
|---|---|---|---|---|
| 9,682,641 | B1* | 6/2017 | Subat | H04R 1/023 |
| 9,706,291 | B1* | 7/2017 | Oswald | H04R 1/345 |
| 2007/0257528 | A1* | 11/2007 | Akaike | B60N 2/002 |
| | | | | 297/216.12 |
| 2014/0270322 | A1* | 9/2014 | Silverstein | H04R 1/023 |
| | | | | 381/391 |
| 2014/0355783 | A1* | 12/2014 | Subat | B60N 2/879 |
| | | | | 381/86 |
| 2015/0201260 | A1* | 7/2015 | Oswald | H04R 1/025 |
| | | | | 381/86 |
| 2016/0059754 | A1* | 3/2016 | Tabata | B60N 2/80 |
| | | | | 297/391 |
| 2018/0029876 | A1* | 2/2018 | Fujita | B60N 2/80 |
| 2018/0035185 | A1* | 2/2018 | Fujita | B60N 2/80 |

FOREIGN PATENT DOCUMENTS

| | | |
|---|---|---|
| JP | 2002-160229 A | 6/2002 |
| JP | 2009-234286 A | 10/2009 |
| JP | 2011-208006 A | 10/2011 |
| JP | 2014-233351 A | 12/2014 |
| WO | WO 91/16186 A1 | 10/1991 |

* cited by examiner

FIG. 8
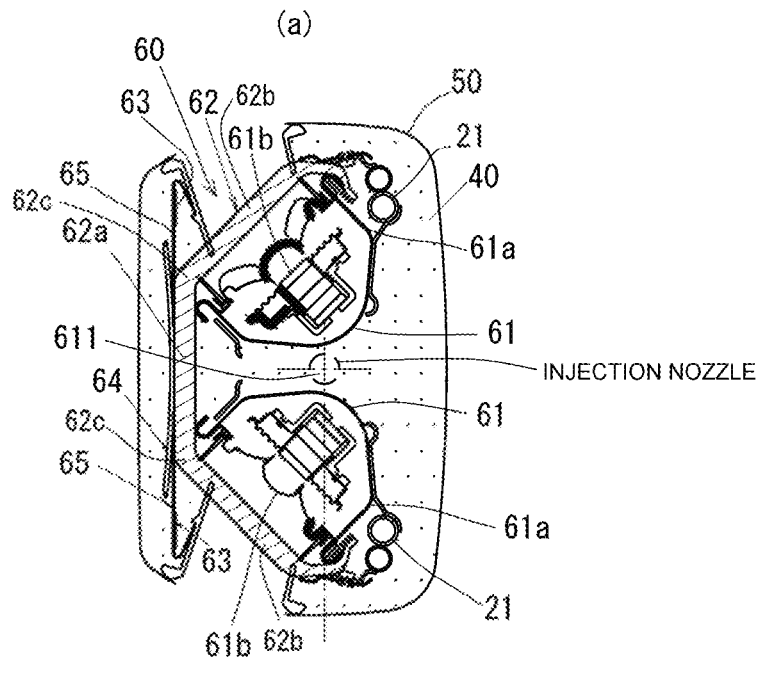
(a)
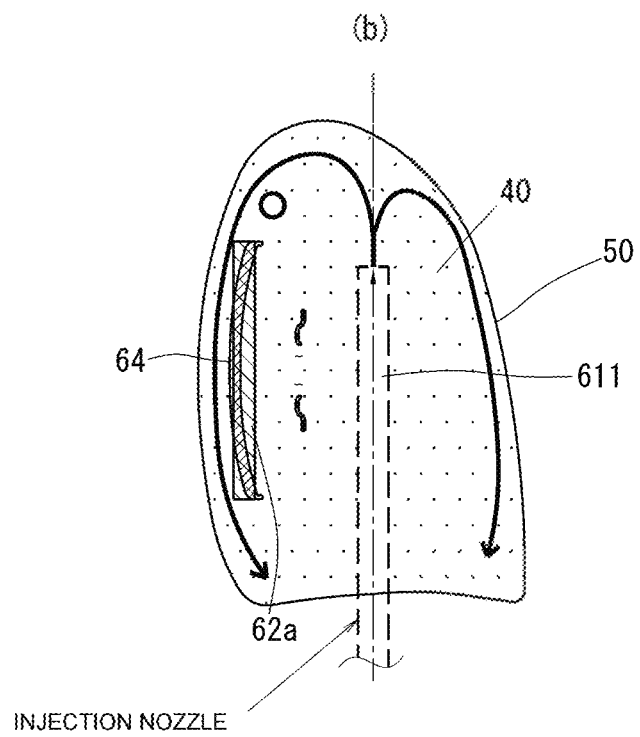
(b)

FIG. 10
(a)
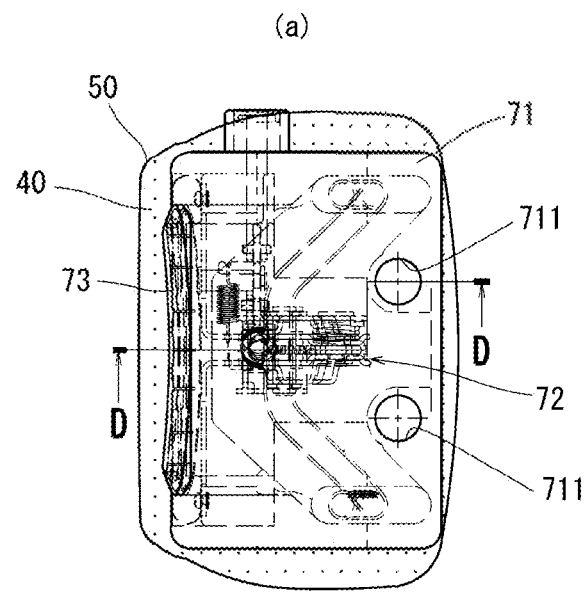
(b)
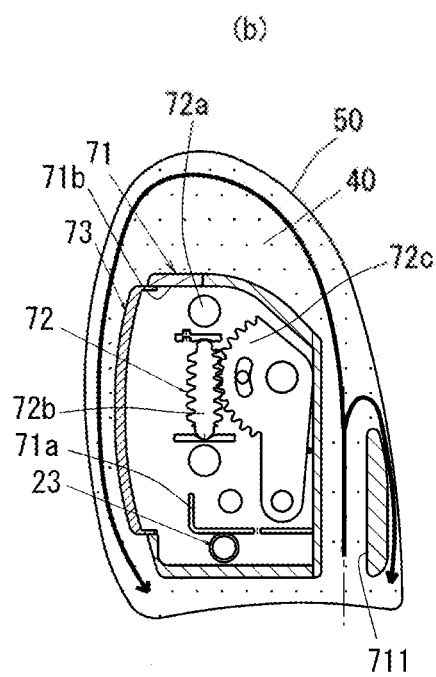

METHOD FOR MANUFACTURING HEADREST, AND HEADREST

TECHNICAL FIELD

The present invention relates to a method for manufacturing a headrest attached to a seat back of a seat structure, and a headrest.

BACKGROUND ART

In a seat structure such as a seat for vehicle, a headrest is provided in a seat back. As shown in Patent Documents 1 and 2, normally, the headrest is composed of polyurethane foam that is supported by a headrest frame and has a thickness of a few cm to 20 cm in a front and back direction and a width of around 20 to 30 cm. In addition, such headrest is manufactured by providing the headrest frame as a core member, in a skin member formed in a bag shape, injecting a polyurethane foam raw material, and performing integral foaming with the skin member.

PRIOR ART DOCUMENT

Patent Document

Patent Document 1: Japanese Patent Application Publication No. 2011-208006
Patent Document 2: Japanese Patent Application Publication No. 2014-233351

SUMMARY OF THE INVENTION

Problem to be Solved by the Invention

As shown in Patent Documents 1 and 2, in general, in a headrest, polyurethane foam obtained by foaming a polyurethane foam raw material is used as a pad. However, in conventional manufacturing methods, only by injecting a predetermined amount of the polyurethane foam raw material in a predetermined position of a skin member attached to a mold, the entire range in the skin member becomes a pad layer, basically, by foaming of the polyurethane foam raw material. This is because there is no article that prevents foaming of the polyurethane foam raw material, excluding a part of the headrest frame, in the skin member. On the other hand, recently, for example, a headrest is required, to which a mechanism for reducing a thickness of the pad layer for reducing weight, a mechanism for adjusting a front and back position of the headrest, a mechanism for providing sound such as a speaker, and the like are inserted in the skin member. In such case, when integral foaming of the pad layer with the skin member is attempted, there are problems that these mechanisms prevent the foaming act of the polyurethane foam raw material, foaming cannot be performed evenly, and underfill is easy to be generated due to gas accumulation, or the like.

The present invention has been made in consideration of the above, and has a problem of providing a method for manufacturing a headrest in which the pad layer can be formed in a required position even when mechanisms having various types of functions are incorporated in the headrest. In addition, the present invention has a problem of providing a headrest in which the pad layer is integrally formed in between the incorporated mechanism having various types of functions and the skin member, including a portion having narrow gap, by the method for manufacturing the headrest.

Means for Solving the Problem

In order to solve the problem, the method for manufacturing the headrest of the present invention having a pad layer supported by a headrest frame including:
disposing a skin member that covers the pad layer, in a mold;
setting inside the skin member an injection-passage-forming member that has a foaming raw material injection passage that is formed so as to run substantially along a vertical direction of the headrest in an orientation of when a seat is attached, and in which a foaming raw material forming the pad layer is injected; and
injecting the foaming raw material through the foaming raw material injection passage, spreading the foaming raw material to the outer side of the headrest that is closer to the skin member from a center of the headrest including a gap between the skin member and the injection-passage-forming member, via the foaming raw material injection passage, foaming the foaming raw material, and performing integral foam molding of the pad layer with the skin member.

A configuration is preferable in which, as the injection-passage-forming member, a member that has a head part supporting plate that can swing front and back around a middle part, in a front part of the injection-passage-forming member, is used and
when the foaming raw material spreads in a gap between the head part supporting plate and the skin member, the head part supporting plate swings due to a flow pressure of the foaming raw material and flow of the foaming raw material in the gap is prompted.

A configuration is preferable in which the head part supporting plate is swingably supported by spring members, and thereby, when the foaming raw material intrudes in the gap between the head part supporting plate and the skin member, from any of end portion sides of the head part supporting plate, the end portion of the intruding side is displaced rearward by the flow pressure of the foaming raw material, and a passage area increases temporarily to make the intruding easy, and on the other hand, the head part supporting plate is restored by a restoring force of the spring members, and deviation of the thickness of the pad layer that locates in the gap between the head part supporting plate and the skin member, and is formed by the foaming of the foaming raw material, is prevented.

It is preferable that, as the injection-passage-forming member including the head part supporting plate, a member that has an outer surface in which the foaming raw material is easy to flow is used.

It is preferable that a surface in the injection-passage-forming member that contacts with the foaming raw material has a fall angle of 30 degrees or less measured in a state where 0.12 ml waterdrop is placed.

It is preferable that the spreading of the foaming raw material is performed by the foaming start lime.

It is preferable that as the injection-passage-forming member, a member that is a functional part composed of at least any one of a shock absorbing member, an acoustic mechanism, and a position adjusting mechanism, and is formed with the foaming raw material injection passage in a substantially center part of the injection-passage-forming member is used.

It is preferable that, as the shock absorbing member, a member that is formed by a bead foam is used.

In addition, the present invention provides a headrest manufactured by the method for manufacturing the headrest described above.

Further, the headrest of the present invention includes a skin member and a pad layer that are supported by a headrest frame, and are provided by integrally foaming, the headrest has in the inside a functional part supported by the headrest frame, the functional part including in a front surface side of the functional part, a head part supporting plate that is supported by an elastic member, and is supported so as to be elastically displaced in a substantially front and back direction, and the pad layer is provided in a gap between the functional part including the head part supporting plate and the skin member.

It is preferable that the elastic member is composed of a leaf spring supported by the functional part, and the head part supporting plate is connected to the leaf spring in a middle position in the vertical direction of the head part supporting plate, can be elastically displaced in a substantially front and back direction, and can elastically swing front and back around the leaf spring, depending on a way of load application.

It is preferable that the functional part includes at least any one of a shock absorbing member, an acoustic mechanism, and a position adjusting mechanism.

It is preferable that the shock absorbing member is formed by a bead foam.

It is preferable that, when the functional part is an acoustic mechanism, the functional part has: right and left enclosures of which opening parts are supported in the headrest frame with predetermined intervals, and right and left speakers that include speaker units that are installed in the enclosures, respectively; and a net member that extends from the opening parts of one of the enclosures to the opening part of the other of the enclosures, and covers each of the opening parts, the head part supporting plate is installed in a front surface of a center part that locates in between right and left sound transmission parts that correspond to the opening parts, respectively, in the net member, and the center part of the net member is filled with foam that is foam molded by intrusion of the foaming raw material, and the functional part includes a function of preventing or blocking interference between sound output from the right and left speaker units due to propagation of the sound in the center part.

Effect of the Invention

According to the present invention, injection-passage-forming member that has a foaming raw material injection passage formed substantially along a vertical direction of a headrest in orientation of when the seat is attached, is set in a skin member, and a foaming raw material that forms a pad layer is injected through the foaming raw material injection passage. Further, the foaming raw material spreads to the outer side of the headrest that is closer to the skin member from a center of the headrest including a gap between the skin member and the injection-passage-forming member, via the foaming raw material injection passage, and the foaming raw material foams. That is, the foaming raw material spreads to the outer side of the headrest in which the pad layer is required to be formed, that is, the inner side of the skin member. Thus, preferably, it is configured so that, since the foaming raw material spreads by the foaming start time, when foaming starts alter the spreading, the pad laser is formed reliably in between an inner surface of the skin member and an outer surface of the injection-passage-forming member. Thus, underfill generated in the pad layer due to injection-passage-forming member that is incorporated in the skin member, is prevented. Moreover, since foaming is performed after the foaming raw material spreads to the outer side of the headrest (inner side of the skin member), the foaming raw material is easy to grow toward a substantially center of the headrest through an irregular part or a hole part that is formed in the injection-passage-forming member itself, or through the foaming raw material injection passage, or the like. As a result, gas accumulation due to foaming is easy to generate in a substantially center or an inner part near the substantially center, not in the outer side of the headrest (inner side of the skin member), and the gas accumulation is prevented from generating in the outer side of the headrest (inner side of the skin member) by which appearance and cushioning property is affected.

As above, the present invention can reduce the thickness of the pad layer than conventional ones, use amount of polyurethane foam and the like composing the pad layer, and weight, by incorporating the injection-passage-forming member. In addition, since the thickness of the pad layer becomes thin, in the front part with which a head part contacts, by providing the head part supporting plate, preferably via spring members, in a swingable manner, even when the thickness of the pad layer is thin, a predetermined shock absorbing function can be secured. Moreover, when the foaming raw material is injected, the head part supporting plate swings by the flow pressure of the foaming raw material, and thereby, even when the gap between the head part supporting plate and the skin member is narrow, flow of the foaming raw material is promoted, and this also performs a function of preventing the foaming raw material from remaining in a middle of the narrow gap.

It is preferable that, as the injection-passage-forming member, a member that is a part that includes various types of functions (functional part) is used. For example, at least any one of the shock absorbing member, acoustic mechanism, and the position adjusting mechanism can be adopted. The shock absorbing member, preferably the shock absorbing member formed of the head foam is installed, and thereby, the shock absorbing function can be improved. In addition, by incorporating the acoustic mechanism, sound can be provided from the headrest. Further, by incorporating the position adjusting mechanism, front and back position adjusting, or the like of the headrest can be performed. In the present invention, outer surfaces of all functional parts are surrounded by the pad layer, and even when these are installed, original function of the headrest is not lost.

In addition, in a case of the shock absorbing member loused of the bead foam, in the foaming raw material injection passage, depending on an insertion degree of an injection nozzle, for example, when the insertion degree is relatively small, the shock absorbing member is incorporated in a state where the foam (for example, polyurethane foam) that is obtained by foaming the foaming raw material is not fixed into the bead foam. Therefore, a series spring structure of the bead foam and the polyurethane foam is obtained. This structure is excellent in that a compression load applied to the bead foam is converted to a direction shifted by 90 degrees (for example, X, Y directions) with respect to, for example, a load direction (for example, Z direction) by the polyurethane foam, and thereby, the force can be released to other directions, the spring constant decreases, and the shock absorbing property is improved. When the insertion degree of the injection nozzle to the foaming raw material injection passage is, for example, relatively large, when the injection nozzle is drawn, inside of the foaming raw material injection passage remains almost hollow. Thereby, when receiving the shock, the bead foam exhibits the flexural property in addition to the compression property, and can absorb energy more efficiently. As a result, in both of when the polyurethane foam remains in the foaming raw material injection passage, and when the foaming raw material injection passage is substantially hollow, acceleration when the shock is applied decreases and a head part obstruction value decreases.

BRIEF DESCRIPTION OF DRAWINGS

FIG. 8(a) is a cross-sectional view taken along B-B line of FIG. 7(a), FIG. 8(b) is a cross-sectional view taken along C-C line of FIG. 7(a), and is a diagram showing by an arrow, a state of flow of the foaming raw material that forms the pad layer.

FIG. 10(a) is a plan view showing an inside structure of a skin member of the headrest of FIG. 9(a). FIG. 10(b) is a cross-sectional view taken along D-D line of FIG. 10(a), and is a diagram showing by an arrow, a state of flow of the foaming raw material that forms the pad layer.

FIG. 11(a) is a perspective view showing appearance of a headrest and a position adjusting mechanism that is an incorporated functional part. FIG. 11(b) is a perspective view of a case of the position adjusting mechanism from a front surface side. FIG. 11(c) is a perspective view of the case of the position adjusting mechanism from a back-surface side.

DESCRIPTION OF THE EMBODIMENTS

Figure 1:
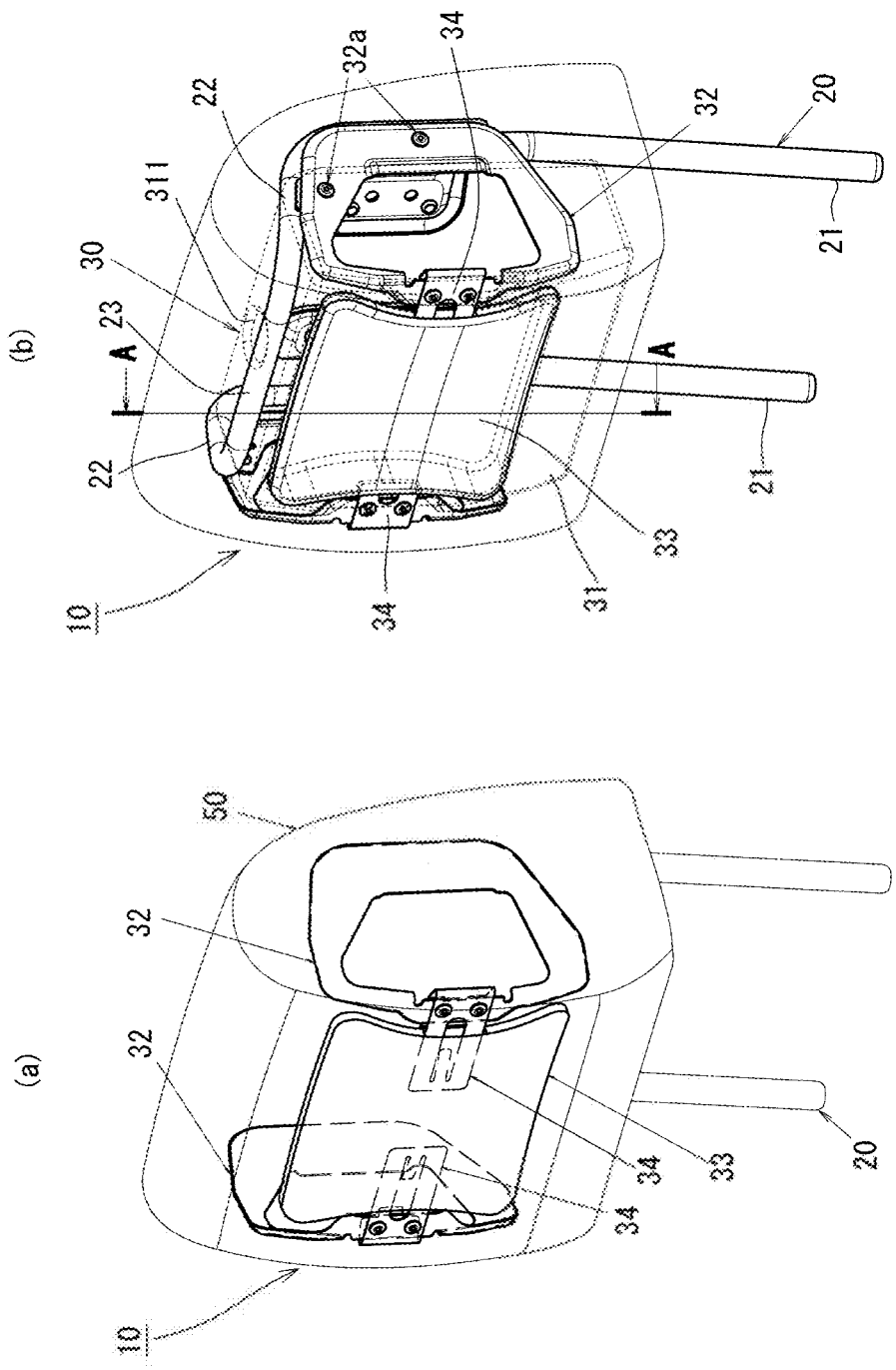
FIG. 1(a) is a perspective diagram showing appearance of a headrest according to a first embodiment of the present invention and a head part supporting plate of a shock absorbing member that is an incorporated functional part.
FIG. 1(b) is a perspective view showing the entire shock absorbing number that is the incorporated functional part, and the appearance of the shock absorbing member.
Figure 2:
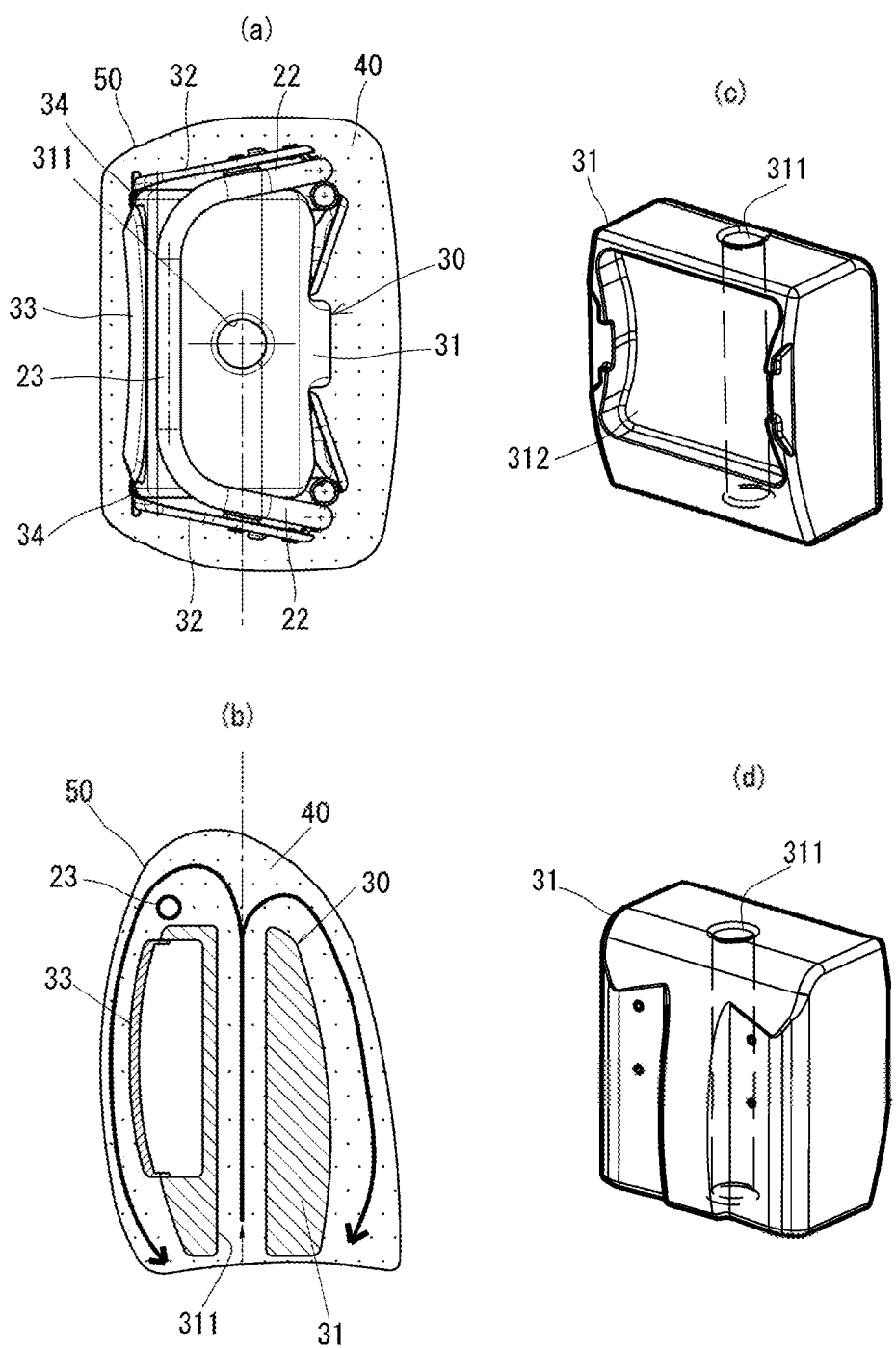
FIG. 2(a) is a plan view showing an inside structure of a skin member of the headrest of FIG. 1(a), (b).
FIG. 2(b) is a cross-sectional view taken along A-A line of FIG. 1(b), and is a diagram showing by an arrow, a state of flow of the foaming raw material that forms the pad layer.
FIG. 2(c) is a perspective view of a foam molded body from a font surface side.
FIG. 2(d) is a perspective view of the foam molded body from a back-surface side.
Figure 3:
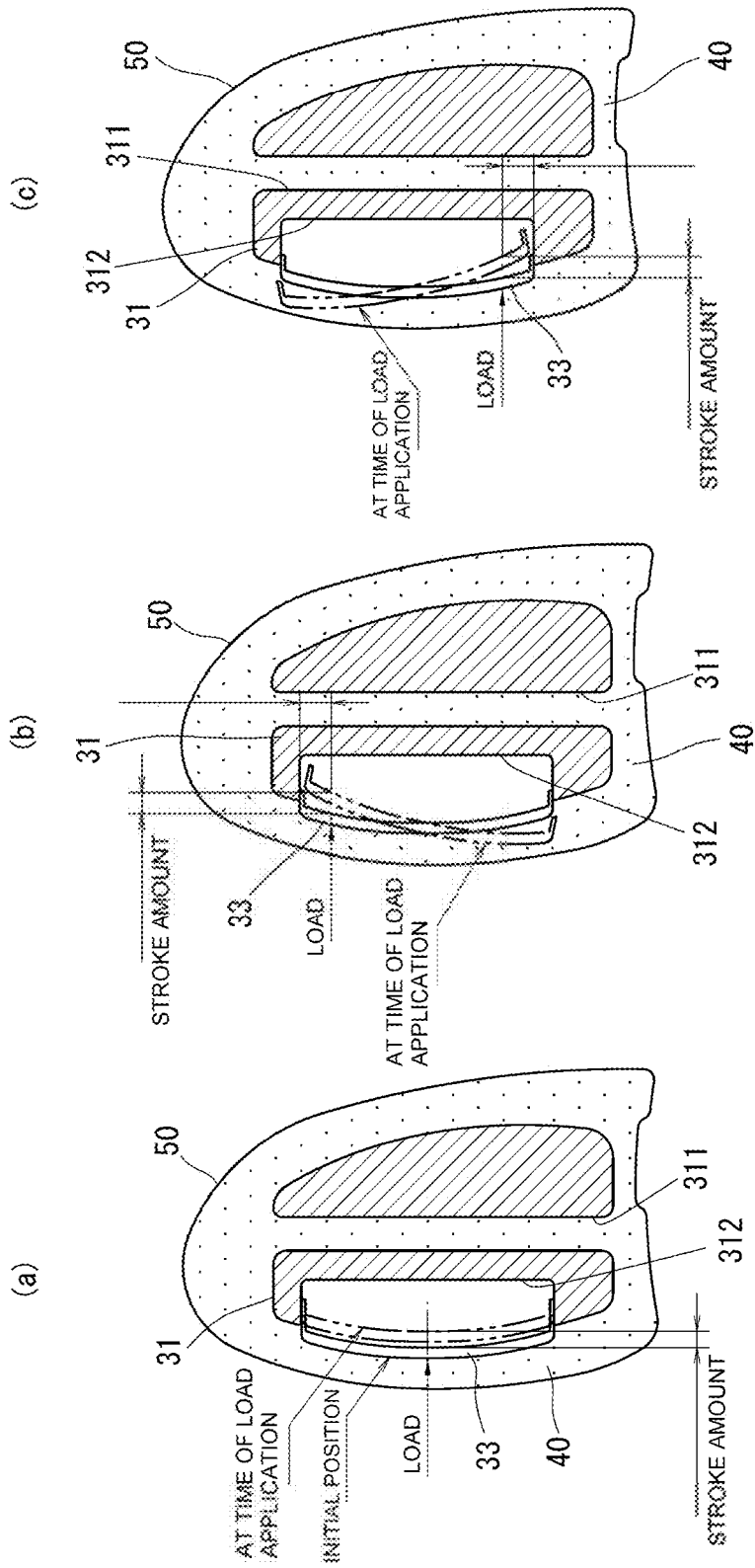
FIG. 3(a) is a diagram for explaining an effect in a case where a load is applied to near a center of the head part supporting plate.
FIG. 3(b) is a diagram explaining an effect in a case where a load is applied in an upper side of the head part supporting plate.
FIG. 3(c) is a diagram explaining an effect in a case where a load is applied in a lower part side of the head part supporting plate.
Figure 4:
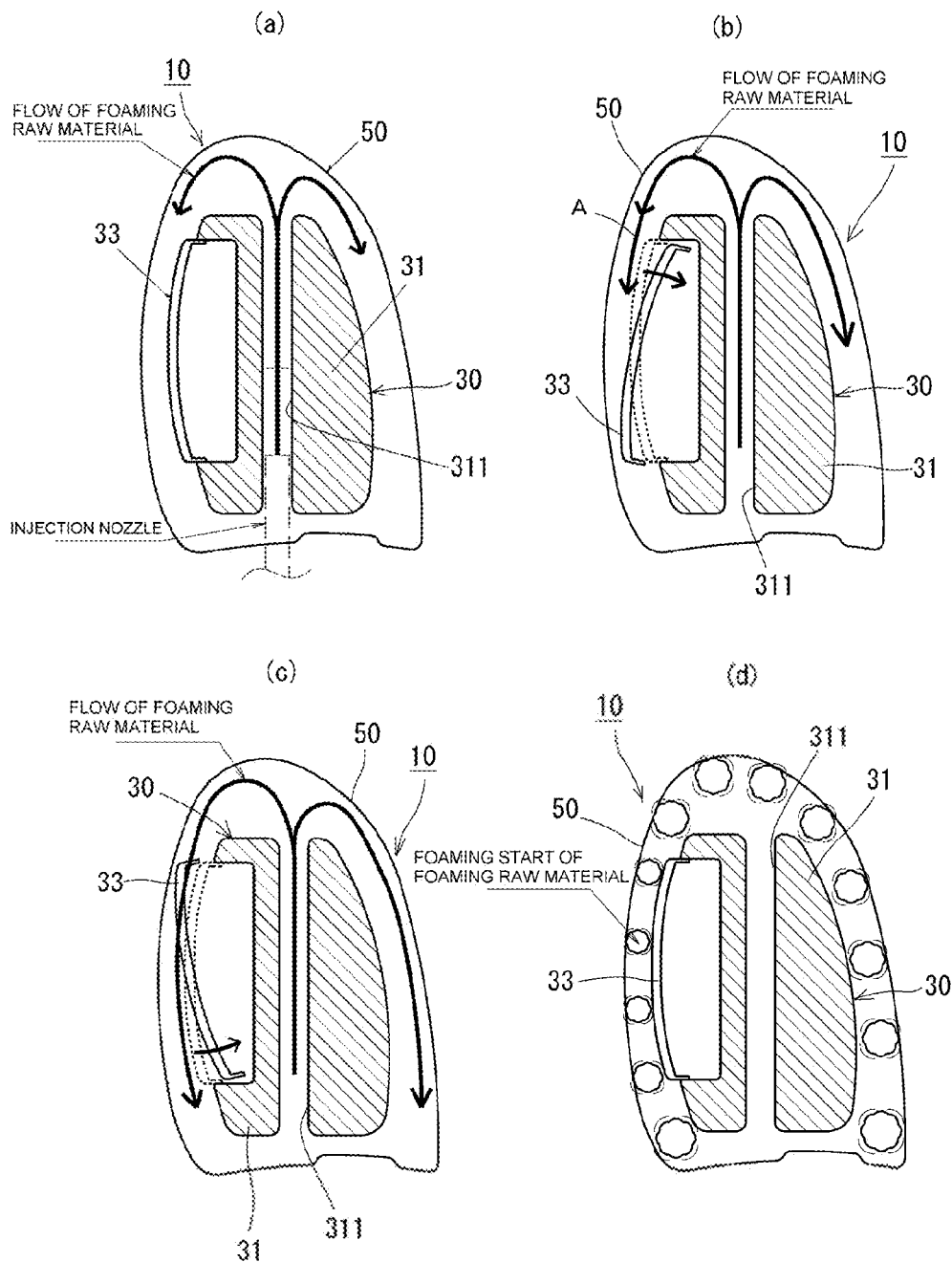
FIG. 4(a) to (d) are diagrams for explaining a step of forming the pad layer by injecting the foaming raw material, of manufacturing steps of the headrest according to the first embodiment.
Figure 5:
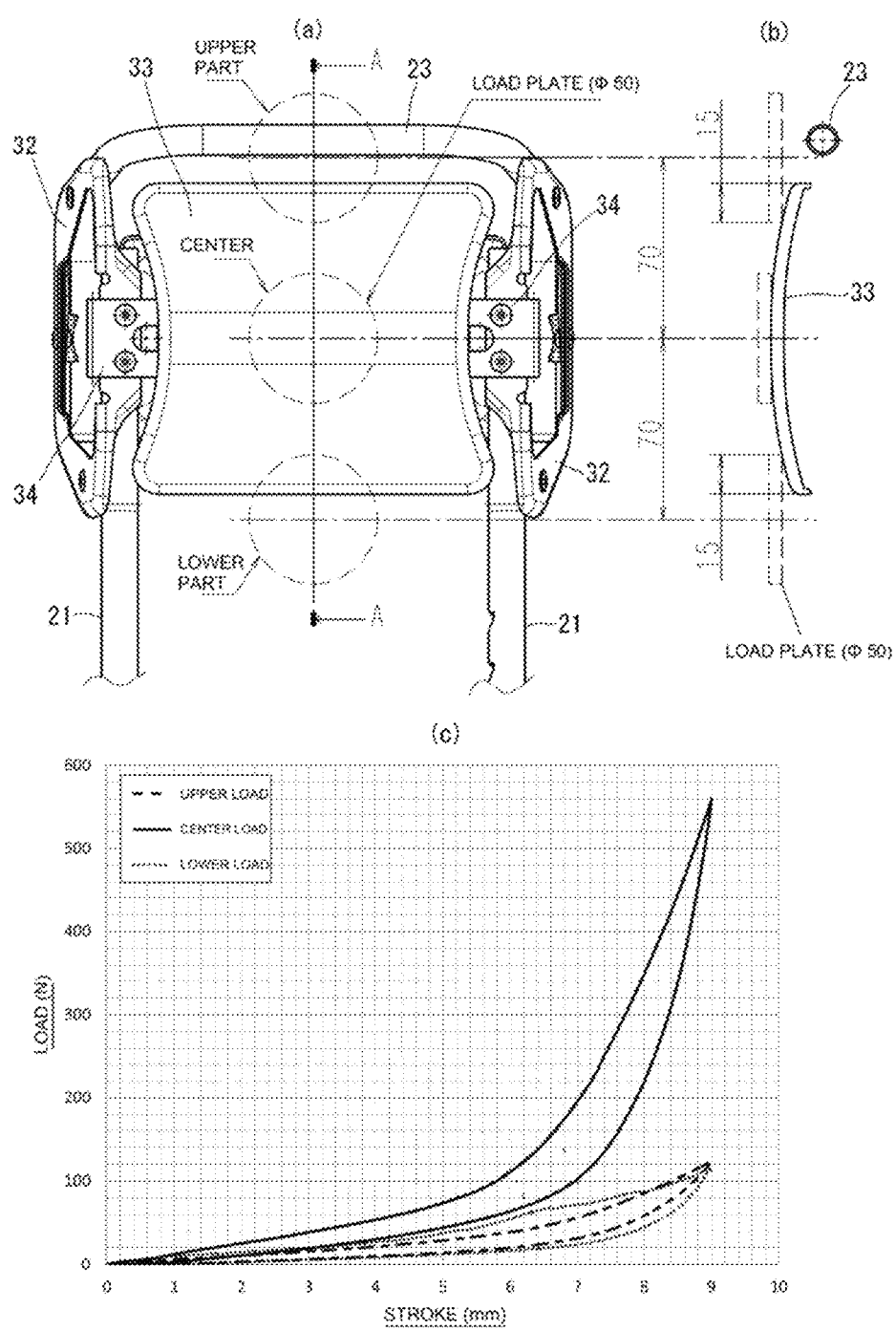
FIG. 5(a) is a front view for explaining a method of measuring load-deflection characteristics of the head part supporting plate.
FIG. 5(b) is a cross-sectional view taken along A-A line of FIG. 5(a).
FIG. 5(c) is a diagram showing load-deflection characteristic that is a measurement result.

Following further describes the present invention in detail on the basis of the embodiments shown in the drawings. FIG. 1 to FIG. 5 are diagrams showing a headrest 10 according to a first embodiment of the present invention. The headrest 10 of the present embodiment is adopted in a seat structure used as a seat for a vehicle such as an automobile, and is arranged in an upper portion of a seat back. The headrest 10 is configured to have a headrest name 20, a shock absorbing member 30, a pad layer 40, and a skin member 50.

The headrest frame 20 is formed in, for example, a substantially U-shape viewed from a front surface, and is configured to have vertical frame parts 21, 21 spaced from each other with a predetermined interval, projection frame parts 22, 22 that extend from upper parts of the vertical frame parts 21, 21 in a forward-projecting direction, and a horizontal frame part 23 that connects front parts of the projection frame parts 22, 22. The vertical frame parts 21, 21 are inserted to a guide hole (not shown) provided in an upper portion of the seat back, and is installed. In the guide hole, normally, a stopper is provided. A plurality of engagement grooves provided in the vertical frame parts 21, 21 along a longitudinal direction engage with the stopper to perform height adjustment.

The shock absorbing member 30 is a functional part that is incorporated in the headrest 10, exhibits the shock absorbing function, and is configured to have a foam molded body 31, a side part supporting member 32, and a head part supporting plate 33. As the foam molded body 31, for example, a foam molded body obtained by a bead method of a resin including at least my one of polystyrene, polypropylene, and polyethylene, can be used. The expansion ratio is not limited and can be set as appropriate, for example, to a range from several times to several tens of times, so that desired shock absorbing property can be obtained.

The side part supporting member 32 can be composed of a plate-shape member made of metal (iron, etc.) or a synthetic resin (for example, polypropylene). The side part supporting member 32 is installed by fixing each of upper edge parts of two side part supporting members 32, 32 to the projection frame parts 22, 22 of the headrest frame 20, and fixing each of rear edge parts to the vertical frame parts 21, 21. Note that, when the side part supporting member 32 is fixed to the projection frame parts 22, 22 or the vertical frame parts 21, 21, the side part supporting member 32 may be directly fixed to the part by a tightening member 32a or may be fixed via a bracket. Further, each side parts of the foam molded body 31 is supported between the two side part supporting members 32, 32 and thereby the foam molded body 31 is installed.

The head part supporting plate 33 is configured to swing front and back around a middle part in a front part of the foam molded body 31. In the present embodiment, in a middle part of a vertical direction in a front edge part of each side part supporting member 32, spring members 34, 34 formed of leaf springs each provided to extend inward are installed. A middle part of a vertical direction of the head part supporting plate 33 is connected to the spring members 34, 34. Thereby, as shown in FIG. 3(a), when a load is applied in a substantially center part from a front surface side to a rear part, the entire head part supporting plate 33 is displaced rearward almost evenly. However, as shown in FIG. 3(b) and FIG. 3(c), when a rearward load is applied unevenly to an upper part or a lower part, the head part supporting plate 33 swings front and back around the connection position with the spring members 34, 34. In a portion to which the head part contacts, desired cushioning property is achieved by securing a predetermined or more thickness of the pad layer, conventionally. On the other hand, according to the present embodiment, the head part supporting plate 33 supported by the spring members 34, 34 operates as above. Thereby, even when the thickness of the pad layer 40 that locates in the front surface of the head part supporting plate 33 is thinner than the conventional one, desired cushioning property can be obtained. Note that this movement of the head part supporting plate 33 performs a predetermined function in manufacturing, which will be described later.

In a periphery of the shock absorbing member 30 including a foam molded body 31, the side part supporting member 32, and the head part supporting plate 33, the pad layer 40 is provided. In an outer surface of the pad layer 40, the skin member 50 is provided. As the pad layer 40, polyurethane foam is used in the present embodiment.

Next, the method of manufacturing the headrest 10 of the present embodiment will be described. First, the skin member 50 is set in a mold, and the headrest frame 20 including the shock absorbing member 30 described above is set in a predetermined position in the skin member 50. In case of setting in the mold, the vertical frame parts 21, 21 of the headrest frame 20 is set so that an end portion that is a lower end when the vertical frame parts 21, 21 are attached to the seat back, projects outward via a through hole formed in the mold. In an injection hole of the mold formed in between parts in which the vertical frame parts 21, 21 project, an injection nozzle is inserted and the foaming raw material (polyurethane foam raw material in the present embodiment) is injected.

This step is similar to conventional manufacturing methods, excluding that the shock absorbing member 30 is set with the headrest frame 20. However, the shock absorbing member 30 in the present embodiment functions as an injection-passage-forming member that controls injection of the foaming raw material in manufacturing. Particularly, in the foam molded body 31 that composes the shock absorbing member 30, a foaming raw material injection passage 311 is formed along a direction that is a vertical direction in orientation of being attached to the seat back. In the foaming raw material injection passage 311, the injection nozzle is inserted and the foaming raw material is injected by a predetermined pressure (see FIG. 4(a)). As shown in FIG. 2(a) to (d), the foam molded body 31 is formed in a substantially rectangular shape having a width that is it in between the right and left side part supporting members 32, 32. Further, the foaming raw material injection passage 311 that vertically extends through a substantially center part of a width direction, is formed. In addition, in the front surface side of the foam molded body 31, a concave part 312 is formed. The concave part 312 is formed in almost same shape and area as that of the head part supporting plate 33 viewed from the front surface. In the present embodiment, the concave part 312 is formed in a substantially square shape viewed from the front surface. Further, the head part supporting plate 33 supported by the spring members 34, 34 is provided so as to locate near an opening end of the concave part 312. The head part supporting plate 33 can be displaced rearward that is a depth direction of the concave part 312 (see FIG. 3(a) to (c)).

The foaming raw material injected from the injection nozzle passes the foaming raw material injection passage 311, and flows into a top part side of the headrest. As shown in FIG. 4(b), the foaming raw material spreads so as to flow from the top part side to the lower part side in a gap between each of outer surfaces of the foam molded body 31 that composes the shock absorbing member 30, the side part supporting member 32, and the head part supporting plate 33, and an inner surface of the skin member 50. At this time, when the foaming raw material passes a gap between the head part supporting plate 33 and a part that locates in the front surface of the skin member 50, the head part supporting plate 33 swings due to the flow pressure of the foaming raw material. Particularly, as shown by an arrow A in FIG. 4(b), when the foaming raw material attempts to flow in the gap between both of the head part supporting plate 33 and the part that locates in the front surface of the skin member 50 from the upper part side of the head part supporting plate 33, the head part supporting plate 33 swings in a direction in which the upper part side of the head part supporting plate 33 is pressed rearward due to the flow pressure. Thus, the gap between the upper part of the head part supporting plate 33 and the skin member 50 is enlarged and the foaming raw material is easy to flow in the gap. When the foaming raw material further flows in the lower part side of the headrest, as shown in FIG. 4(c), the foaming raw material presses the lower part side of the head part supporting plate 33, makes the lower part side swing rearward by the restoring force of the spring members 34, 34, enlarges the gap between the lower part of the head part supporting plate 33 and the skin member 50, and passes the gap. Since the head part supporting plate 33 can swing by being supported by the spring members 34, 34, even when the gap between the head part supporting plate 33 and the skin member 50 is small, the foaming raw material can be spread entirely. Thereby, the thickness of the pad layer 40 formed in between the head part supporting plate 33 and the skin member 50 can be made thinner. In addition, by the swing action of the head part supporting plate 33, the foaming raw material flows rapidly. Thus, a position where the foaming raw material does not flow and remains is hard to generate, and deviation of the thickness of the pad layer 40 formed by foaming is prevented.

Figure 6:
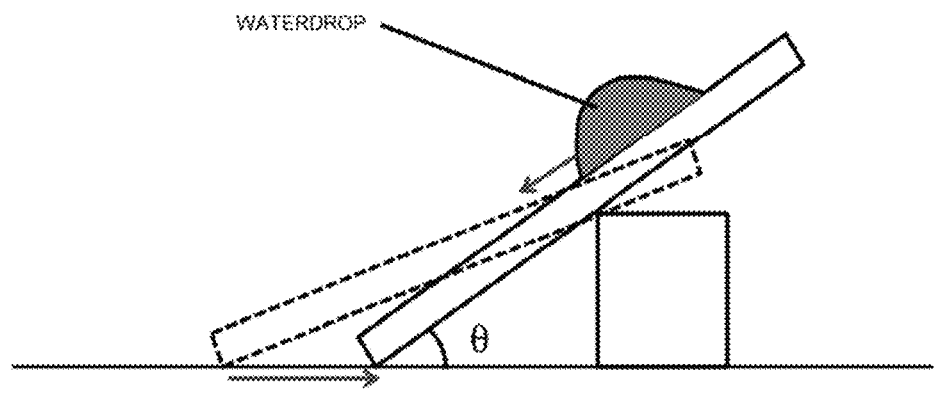
FIG. 6 is a diagram for explaining a measurement method of a fall angle.

As a device for making the foaming raw material flow rapidly in the gaps between each of the foam molded body 31, the side part supporting member 32, and the head part supporting plate 33, that compose the shock absorbing member 30 and the skin member 50 and spread entirely in the gaps, preferably by the foaming start time, in addition to the swing act of the head part supporting plate 33 described above, it is preferable that the outer surfaces have small factional resistance with the foaming raw material. Therefore, it is preferable that the outer surface of the foam molded body 31 is a skin layer formed in a bead foam. It is preferable that the head part supporting plate 33 is formed by a synthetic resin such as polypropylene. Next table shows a result of that, in three types of material surfaces (flat plates) of a surface in which the skin layer of the bead foam is not formed, a surface in which the skin layer of the bead foam is formed, and a plate made of polypropylene (PP plate) used in the head part supporting plate 33, as shown in FIG. 6, three (0.12 ml) waterdrops are dropped, the flat plate is gradually inclined from a horizontal state, and an inclination angle (fall angle) θ at a time when the waterdrops are start to slip, is measured 5 times. Note that used bead foam is a foaming polyethylene of 30 times foaming.

TABLE 1

| Material | Fall angle (degree) | | | | | Average (degree) |
|---|---|---|---|---|---|---|
| Bead foam (surface with no skin layer formed) | 42 | 42 | 41 | 38 | 37 | 40.0 |
| Bead foam surface with skin layer formed) | 27 | 28 | 26 | 27 | 28 | 27.2 |
| PP plate | 22 | 25 | 23 | 22 | 22 | 22.8 |

Table 1 shows an experimental result using the waterdrops. It is found that in a case of a surface in which there are minute irregularities such as a surface in which the skin layer of the bead foam is not formed, the fall angle is larger than that of the surface in which the skin layer is formed and the PP plate. Accordingly, in order to make the foaming raw material rapidly flow when contacting with the surface, it is preferable that the surface to which the foaming raw material contacts in the foam molded body 31 is provided so that the skin layer of the bead foam locates, and as the head part supporting plate 33, a plate having smaller fall angle, such as the PP plate, is used. Even when a part made of metal such as iron is used as the side part supporting member 32, it is preferable that a contacting surface with the foaming raw material is processed to have small fall angle. According to table 1, the configuration is preferable in which a surface having a fall angle of 30 degrees or less of the waterdrops measured in the condition described above is a contacting surface with the foaming raw material. More preferably, it is 25 degrees or less.

According to the present embodiment, the foaming raw material spreads in all directions via the foaming raw material injection passage 311, rapidly flows in the gaps between each of the foam molded body 31, the side part supporting member 32, and the head part supporting plate 33, that compose the shock absorbing member 30, and the skin member 50 as above, and spreads entirely to the gaps, preferably by the foaming start time. Accordingly, when the foaming raw material starts to foam, the foaming raw material grows from the outer side of the headrest (inner side of the skin member 50) toward the substantially center of the headrest. Thus, gas accumulation is hard to generate in a boundary surface with the skin member 50, and poor appearance is prevented from occurring (see FIG. 4(d)).

When the present invention is manufactured in this way, the polyurethane foam remains in the foaming raw material injection passage 311, and incorporation is performed in a state where the polyurethane foam is not fixed into the foam molded body 31. Thereby, a series spring structure of the bead foam that composes the foam molded body 31 and the polyurethane foam is formed. Thus, the compression load applied to the bead foam can be released to other directions by the polyurethane foam, the spring constant degreases, and the shock absorbing property is improved. When an insertion degree of the injection nozzle to the foaming raw material injection passage 311 is, for example, relatively large, when the injection nozzle is pulled off, the inside of the foaming raw material injection passage 311 remains almost hollow. Thereby, in a case of receiving shock, the bead foam is easy to be deformed. Note that whether the polyurethane foam is remained in the foaming raw material injection passage 311, or the foaming jaw material injection passage 311 made almost hollow, can be adjusted by the insertion degree of the insertion nozzle as described above. However, in either case, the thickness of the bead foam itself is thinner than that in a case where the whole including a part corresponding to the foaming raw material inflow passage is formed by the bead foam.

Note that, in a normal use in which the headrest 10 of the present embodiment is mounted in the seatback, as shown in FIG. 3(a), when a load is applied around the substantially center part of the head part supporting plate 33, the whole is displaced rearward and vibration and shock are absorbed by elasticity of the spring members 34, 34. When a load is applied to the upper side or the lower side, as shown in FIG. 3(b) and FIG. 3(c), the upper part or the lower part of the head part supporting plate 33 swings front and back around the spring members 34, 34 and the vibration and shock are absorbed. Therefore, the pad layer 40 between the head part supporting plate 33 and the skin member 50 that locates in the front surface of the head part supporting plate 33 can exhibit predetermined cushioning property even when the thickness is thin.

FIG. 5(c) is a diagram showing load-deflection characteristic of the head part supporting plate 33 in a state of being supported by the spring members 34, 34 in a front surface of the foam molded body 31. As shown in FIG. 5(a), (b), FIG. 5(c) is measurement data in which the "upper load" is a case of applying a load in an upper part of the head part supporting plate 33, the "center load" is a case of applying a load in the vicinity of the center of the head part supporting plate 33, and the "lower load" is a case of applying a load in a lower part of the head part supporting plate 33. In any of the cases, a load is applied to a position shown in FIG. 5(a), (b) by using a load plate having a diameter of 50 mm. In the measurement data, the spring constants in straight parts in each of the cases were 6 N/mm in case of the "upper load", 8 N/mm in case of the "lower load", and 15 N/mm in case of the "center load". In a normal seating time, a supporting load of the head part is often applied to more or less the upper side or the lower side. However, when a load is applied in such a way, a load of a head part of a human can be supported by a lower spring constant. On the other hand, when a predetermined or more amount of shock is applied, the whole of the head part supporting plate 33 is displaced rearward, and thereby indication in that case corresponds to the "center load" and relatively high spring constant acts. When the stroke is equal to or more than about 6 mm, the spring constant rises sharply, and it is understood that the head part supporting plate 33 can withstand strong shock.

Figure 7:
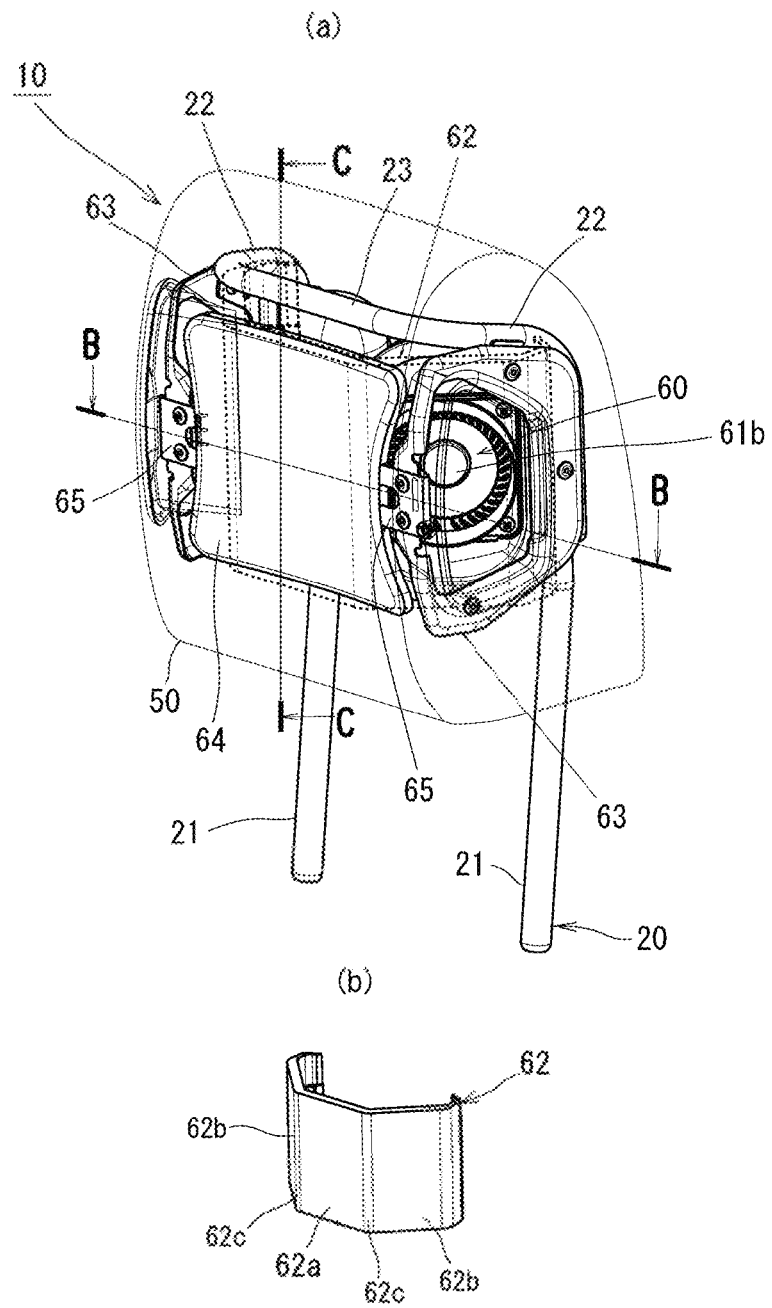
FIG. 7(a) is a perspective view showing appearance of a headrest according to a second embodiment of the present invention and an acoustic mechanism that is an incorporated functional part.
FIG. 7(b) is a perspective view showing a net member.

FIG. 7 and FIG. 8 show a second embodiment of the present invention. The present embodiment has structure in which an acoustic mechanism 60 is installed as a functional part. The acoustic mechanism 60 is configured to have right and left speakers 61, 61 that are supported by the headrest frame 20. The acoustic mechanism 60 having the right and left speakers 61, 61 composes the injection-passage-forming member of the present embodiment. The two speakers 61, 61 are installed with predetermined gaps in right and left. The gap extends along the vertical direction of orientation of when the seat is attached to the seat back. Accordingly, the gap is a foaming raw material injection passage 611 in the acoustic mechanism 60 in the present embodiment used as the injection-passage-forming member in manufacturing.

The speakers 61, 61 are configured to have enclosures 61*a*, 61*a* that are attached to the vertical frame parts 21, 21 of the headrest frame 20, and speaker units 61*b*, 61*b* that are attached to the enclosures 61*a*, 61*a*, and output sound. The speakers 61, 61 of the present embodiment are installed in orientation in which each of opening parts of the enclosures 61*a*, 61*a* face outward by about 45 degrees with respect to forward, and the opening parts of the enclosures 61*a*, 61*a* have a predetermined interval with each other, in order to make sound be easy to spread. In addition, a net member 62 that has a length extending from an edge part of the outside of the opening part of one enclosure 61*a* to an edge part of the outside of the opening part of the other enclosure 61*a*, and covers each opening part, is provided. As the net member 62, a two-dimensional net or a three-dimensional fabric can be used. Thereby, while a predetermined sound transmission function is secured, cushioning property and vibration absorbing property that are required for supporting the head part can also be included.

It is preferable that, among three-dimensional fabrics, a three-dimensional knitted fabric is used. The three-dimensional knitted fabric is formed by bonding a pair of ground knitted fabrics arranged by being spaced from each other, by a connection yarn. Each of the ground knitted fabrics can be formed to be a flat fabric texture (fine stitch) that continues in both directions of a wale direction and a course direction, and can be formed to be a fabric texture having a honeycomb (hexagon) mesh, for example, from a yarn obtained by twisting a fiber. The connection yarn applies predetermined rigidity to the three-dimensional knitted fabric so that one of the ground knitted fabrics and the other of the ground knitted fabrics maintain a predetermined interval. Thereby, high cushioning property and vibration absorption property can be exhibited. In addition, due to the tensile force applied in the surface direction, the yarn of the ground knitted fabrics that compose the three-dimensional knitted fabric and face to each other, or the connection yarn that connects the ground knitted fabrics facing to each other can be vibrated. Thereby, chord vibration is generated by output sound of the speaker units 61*b*, 61*b*, the vibration is propagated in the surface direction of the three-dimensional knitted fabric. A sound wave emitted forward from the three-dimensional knitted fabric becomes a sound wave having the three-dimensional knitted fabric as a surface sound source. That is, the three-dimensional knitted fabric performs a function of converting the output sound of the speaker units 61*b*, 61*b* to a sound wave from the surface sound source having wider area than that of the point sound source, and emitting the sound wave to the outside.

The net member 62 is installed so as to be across the two enclosures 61*a*, 61*a* that face outward by 45 degrees as above. Thus, the portions that correspond to the opening parts of the enclosures 61*a*, 61*a* and locate in a front part of the speaker units 61*b*, 61*b* are the sound transmission units 62*b*, 62*b*. In the present embodiment, a center part 62*a* between the sound transmission units 62*b*, 62*b* is an installment position that projects forward as shown in FIG. 7(*b*), and FIG. 8(*a*). In the vertical frame parts 21, 21 and the projection frame parts 22, 22 of the headrest frame 20, as similar to the embodiment described above, side part supporting members 63, 63 are attached. The head part supporting plate 64 is supported by the two spring members 65, 65 composed of leaf springs provided in a front edge parts of the side part supporting members 63, 63 so as to project inward. At this time, the head part supporting plate 64 is provided so as to locate in a front surface of the center part 62*a* of the net member 62. Note that, since the acoustic mechanism 60 of the present embodiment composes the functional part that is the injection-passage-forming member in manufacturing, the acoustic mechanism 60 includes not only the speakers 61, 61 and the net member 62 described above, but also the side part supporting members 63, 63, the head part supporting plate 64, and the spring members 65, 65.

In the present embodiment, as similar to the embodiment described above, the headrest frame 20 attached with the acoustic mechanism 60 is set in the mold and the foaming raw material is injected. The injection nozzle is inserted in a gap between the two speakers 61, 61 that is the foaming raw material injection passage 611. The foaming raw material injected from the injection nozzle spreads in all directions from the top part side of the headrest 10 via the foaming raw material injection passage 611, and flows in a direction to the lower part side at the time of attachment of the seat back (see FIG. 8(*b*)). When the foaming raw material passes the gap between the head part supporting plate 64 and the skin member 50 that locates in the front surface of the head part supporting plate 64, the head part supporting plate 64 is arranged so as to cover the front surface of the center part 62*a* of the net member 62. Thus, by the cushioning property of the net member 62, when the foaming raw material spreads and flows in the gap from the upper part side of the head part supporting plate 64, the upper part side of the head part supporting plate 64 is pressed rearward to make the net member 62 deform for that amount. Particularly, since the center part 62*a* of the net member 62 is pressed by the movement of the head part supporting plate 64, while slightly compressing the center part 62*a*, the head part supporting plate 64 causes deformation so that the center part 62*a* is curved slightly rearward from the boundary parts 62*c*, 62*c* with the sound transmission parts 62*b*, 62*b* that contact with the edge parts of the enclosures 61*a*, 61*a*. Thereafter, the head part supporting plate 64 attempts to return to the original orientation by the restoring force of the spring members 65, 65. Further, the lower part side of the head part supporting plate 64 is pressed rearward, and the head part supporting plate 64 attempts to return to the original orientation by the restoring force of the spring members 65, 65 again. The head part supporting plate 64 swing in this way. Thus, as similar to the embodiment described above, in a small gap between the head part supporting plate 64 and the skin member 50 that locates in the front surface of the head part supporting plate 64, the foaming raw material can flow and spread. When the spread foaming raw material starts to foam, the foaming raw material mainly grows inward from a portion closer to the outside of the headrest 10 (inner surface of the skin member 50). Thereby, gas accumulation is hard to generate in the boundary surface with the skin member 50 and this is similar to the embodiment described above.

As described above, the foaming raw material flows smoothly by the movement of the head part supporting plate 64 in the gap between the head part supporting plate 64 and the skin member 50 that locates in the front surface of the head part supporting plate 64. However, due to the existence of the head part supporting plate 64, the foaming raw material is hard to intrude in the inside of the net member 62 from the front surface side of the net member 62 that is the head part supporting plate 64 side. However, from a back-surface side of the net member 62, the foaming raw material intrudes in the net member 62. At this time, since each of the boundary parts 62c, 62c of the net member 62 are pressed against edge parts of each of the enclosures 61a, 61a, although the foaming raw material intrudes in the inside of the center part 62a, the foaming raw material hardly flows outward from each of the boundary parts 62c, 62c. Thus, the foaming raw material does not inhibit the sound transmission function of the sound transmission parts 62b, 62b that locate in the front part of the speaker units 61b, 61b. On the other hand, by performing foam molding of the foaming raw material that has intruded in the center part 62a, the center part 62a is filled with the foam (in the present embodiment, polyurethane foam). Thereby, the center part 62a performs a function of preventing or blocking interference between sound output from the speaker units 61b, 61b due to the propagation in the center part 62a, increases independence of sound energy that is transmitted through the right and left sound transmission parts 62b, 62b, and enhances the stereo feeling.

Note that, a feature that the head part supporting plate 64 supported by the spring members 65, 65 strokes and supports the load of the head part, is similar to the first embodiment.

Figure 9:
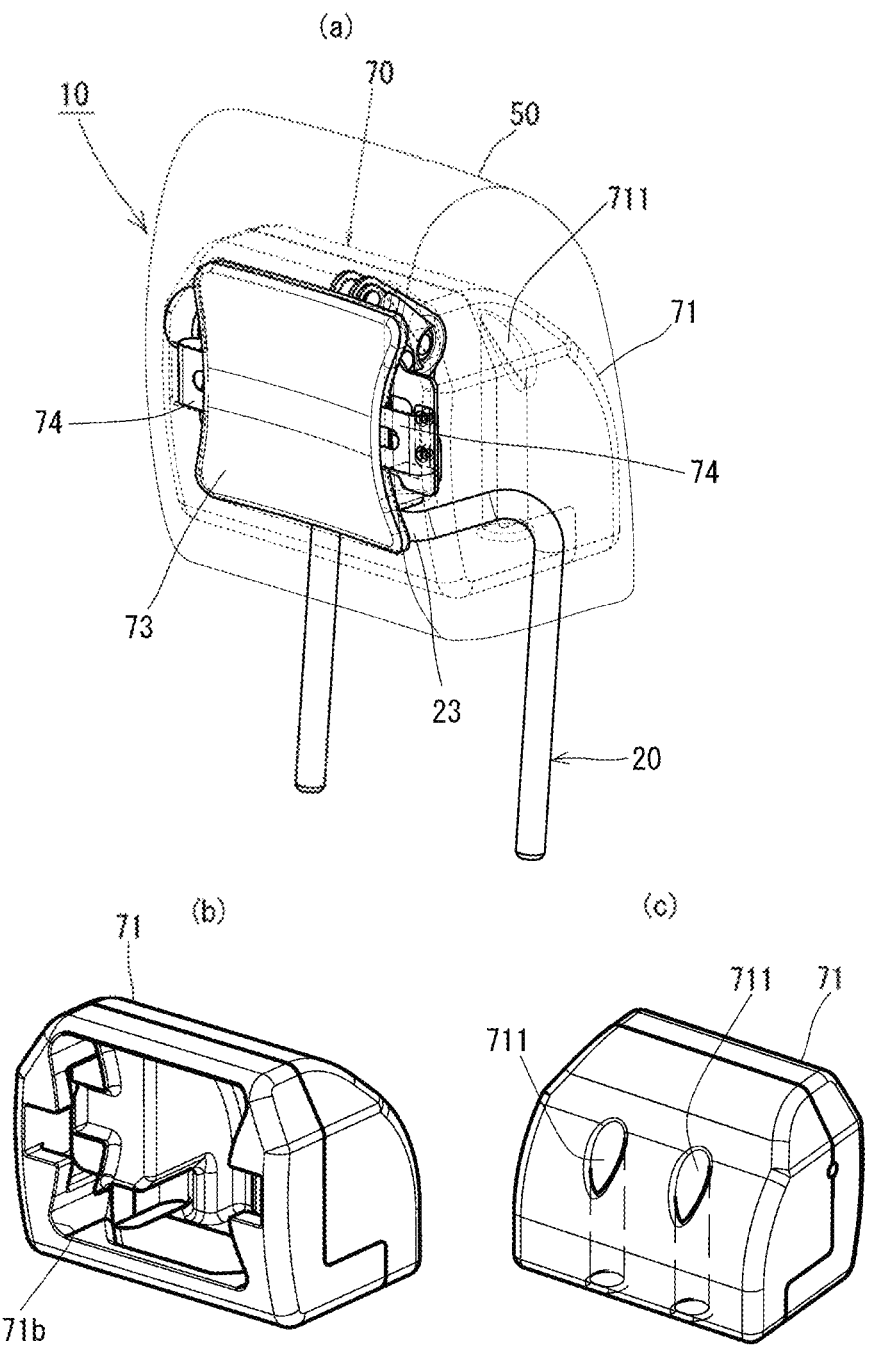
FIG. 9(a) is a perspective view showing appearance of a headrest according to a third embodiment of the present invention and a position adjusting mechanism that is an incorporated functional part.
FIG. 9(b) is a perspective view showing a case of the position adjusting mechanism from a front surface side.
FIG. 9(c) is a perspective view of the case of the position adjusting mechanism from a back-surface side.

FIG. 9 and FIG. 10 show a third embodiment of the present invention. The present embodiment has structure in which a position adjusting mechanism 70 is installed as a functional part. The position adjusting mechanism 70 is configured to have a case 71 that is supported by the headrest frame 20, and a mechanism part 72 accommodated in the case 71. A lower part of the case 71 is fixed to the horizontal frame part 23 of the headrest frame 20 via a fixing bracket 71a, and a front surface of the case 71 is formed with an opening part 71b. The mechanism part 72 is configured to have a connection frame 72a that is connected to the case 71 side, a worm 72b that is supported rotatably by the connection frame 72a, and a sector gear 72c of which lower part is supported rotatably by the fixing bracket 71a and of which teeth formed in the upper part side engage with teeth of the worm 72b. When the headrest 10 is gripped and is moved forward or rearward, front and back position adjustment can be performed by the case 71 moving forward or rearward. However, when the case 71 moves front and back, the sector gear 72c rotates forward and rearward and the worm 72b engaging with the sector gear 72c rotates. Therefore, when movement of the headrest 10 is stopped, stepless locking can be performed by the engagement of both of the sector gear 72c and the worm 72b.

The position adjusting mechanism 70 functions as the injection-passage-forming member in manufacturing. Thus, in a position where the mechanism port 72 is not installed in the case 71, in the present embodiment, foaming raw material injection passages 711, 711 are formed in two positions along a vertical direction at the time when the position adjusting mechanism 70 is attached to the seat back in close position to a rear part of the case 71.

In the opening part 71b formed in the front surface of the case 71, as shown in FIG. 9(a), the head part supporting plate 73 of which a middle part of a vertical direction is supported by spring members 74, 74 formed of leaf springs attached to right and left frame parts of the opening part 71b, is attached. The head part supporting plate 73 is formed in a shape and an area of an extent that can block the opening part 71b.

In manufacturing, as similar to the embodiments described above, the injection nozzle is inserted to the foaming raw material injection passages 711, 711 and the foaming raw material is injected. The foaming raw material spreads all directions from the top part side of the headrest 10 and flows (see FIG. 10(b)). However, when the foaming raw material passes the gap between the head part supporting plate 73 and the skin member 50 that locates in the front surface of the head part supporting plate 73, as similar to the embodiments described above, the head part supporting plate 73 swings around the spring members 74, 74, and prompts flow. Thereafter, foaming starts. However, the other operations and effects are similar to the embodiments described above. Note that the case 71 can also be formed of bead foam, in terms of reducing cost and weight.

Figure 11:
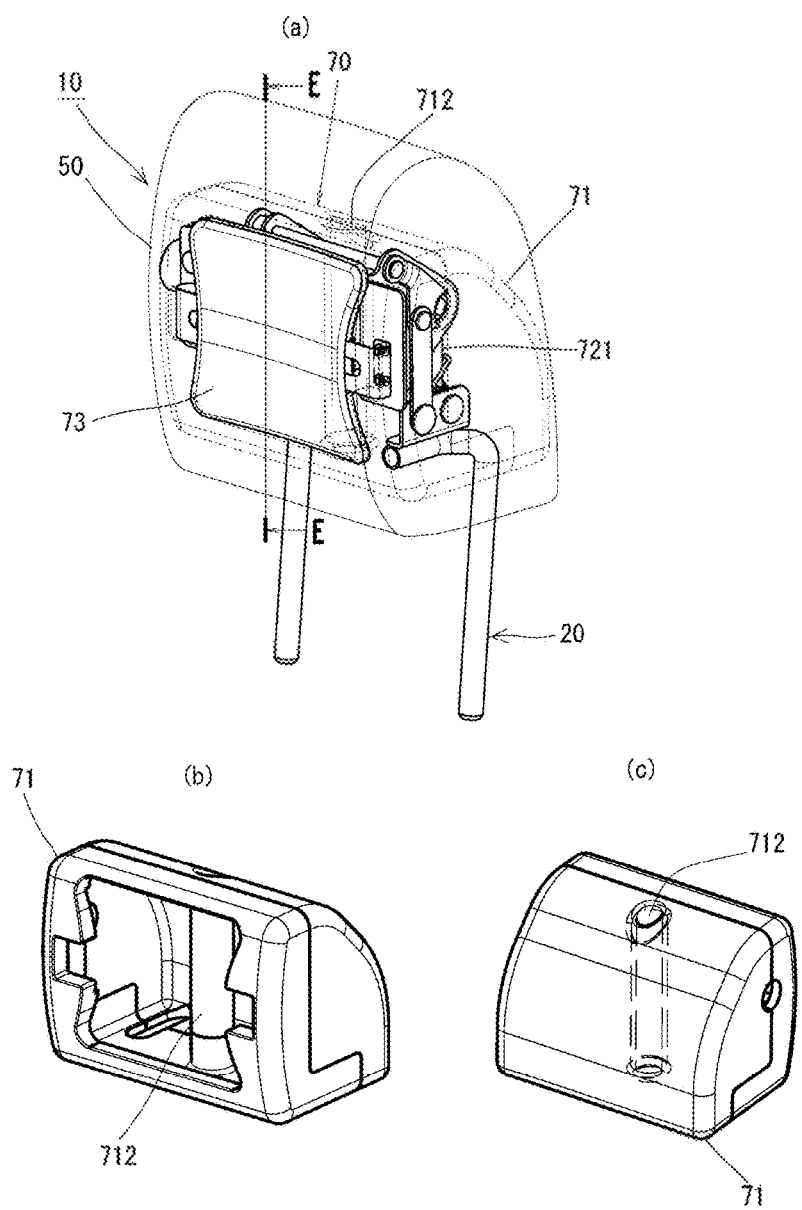
FIG. 11 is a view showing another variation of the third embodiment of the present invention.
Figure 12:
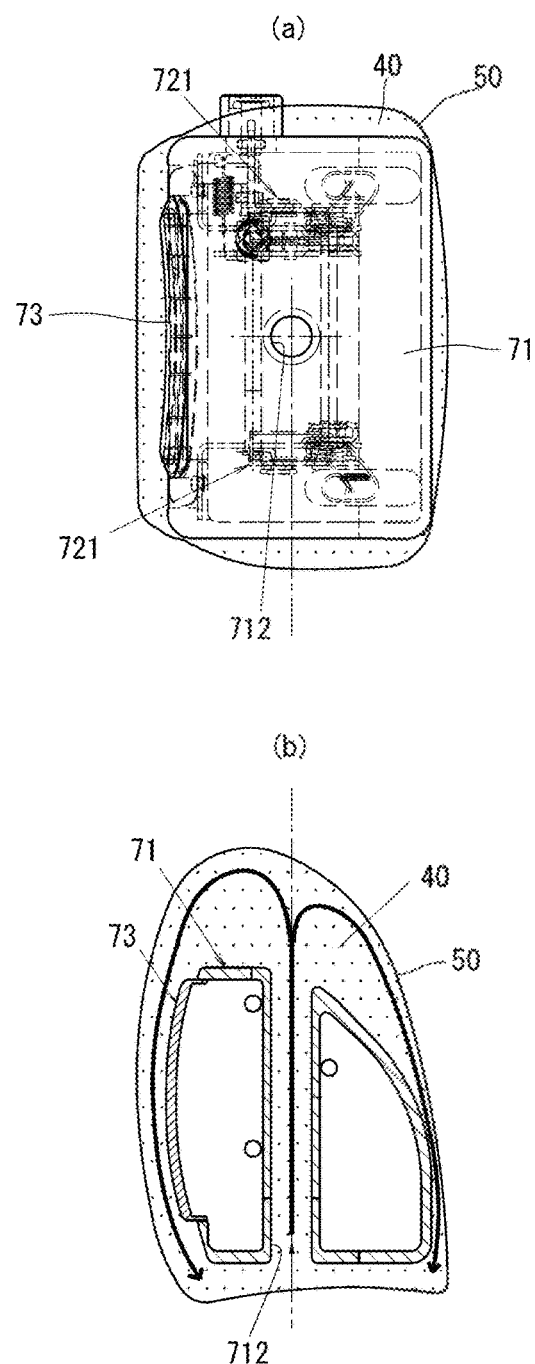
FIG. 12(a) is a plan view showing an inner mechanism of the skin member of the headrest of FIG. 11(a).
FIG. 12(b) is a cross-sectional view taken along E-E line of FIG. 11(a), and is a diagram showing by an arrow, a state of flow of the foaming raw material that forms the pad layer.

In the third embodiment described above, with respect to the installment position of the mechanism part 72 in the case 71, the foaming raw material injection passages 711, 711 is offset. However, as shown in FIG. 11 and FIG. 12, the foaming raw material injection passage 712 may be formed along the vertical direction in a substantially center part of the case 71, and the mechanism parts 721, 721 may be divided into two sets, to install the foaming raw material injection passages 711, 711 in right and left of the foaming raw material injection passage 712.

Note that the shock absorbing member 30, the acoustic mechanism 60, and the position adjusting mechanism 70 that are functional parts that compose the injection-passage-forming member in manufacturing shown in the embodiments described above, are all exemplifications. Naturally, the structure is not limited to these.

EXPLANATION OF REFERENCES

10 Headrest
20 Headrest frame
30 Shock absorbing member
31 foam molded body
311 foaming raw material injection passage
32 Side part supporting member
33 Head part supporting plate
34 Spring member
40 Pad layer
50 Skin member
60 Acoustic mechanism
61 Speaker
611 Foaming raw material injection passage
62 Net member
63 Side part supporting member
64 Head part supporting plate
65 Spring member
70 Position adjusting mechanism
71 Case
711, 712 Foaming raw material injection passage
72, 721 Mechanism part
73 Head part supporting plate
74 Spring member

The invention claimed is:

1. A method for manufacturing a headrest having a pad layer supported by a headrest frame, the method comprising:
   disposing a skin member that covers the pad layer, a mold;
   setting inside the skin member an injection-passage-forming member that has a foaming raw material injection passage that is formed so as to run substantially along a vertical direction of the headrest in an orientation of when a seat is attached, and in which a foaming raw material forming the pad layer is injected; and
   injecting the foaming raw material through the foaming raw material injection passage, spreading the foaming raw material to the outer side of the headrest that is closer to the skin member from a center of the headrest including a gap between the skin member and the injection-passage-forming member, via the foaming raw material injection passage, foaming the foaming raw material, and performing integral foam molding of the pad layer with the skin member.

2. The method for manufacturing a headrest according to claim 1, wherein, as the injection-passage-forming member, a member that has a head part supporting plate that can swing front and back around a middle part, in a front part of the injection-passage-forming member is used, and when the foaming raw material spreads in a gap between the head part supporting plate and the skin member, the head part supporting plate swings due to a flow pressure of the foaming raw material, and flow of the foaming raw material in the gap is prompted.

3. The method for manufacturing a headrest according to claim 2, wherein the head part supporting plate is swingably supported by spring members, and thereby, when the foaming raw material intrudes to a gap between the head part supporting plate and the skin member from any of end portion sides of the head part supporting plate, the end portion of the intruding side is displaced rearward by the flow pressure of the foaming raw material, and a passage area increases temporarily to make the intruding easy, and on the other hand, the head part supporting plate is restored by a restoring force of the spring members, and deviation of the thickness of the pad layer that locates in the gap between the head part supporting plate and the skin member, and is formed by the foaming of the foaming raw material, is prevented.

4. The method for manufacturing a headrest according to claim 1, wherein, as the injection-passage-forming member including the head part supporting plate, a member that has a surface in which the foaming raw material is easy to flow is used.

5. The method for manufacturing a headrest according to claim 4, wherein a surface in the injection-passage-forming member that contacts with the foaming raw material has a fall angle of 30 degrees or less measured in a state where 0.12 ml waterdrop is placed.

6. The method for manufacturing a headrest according to claim 1, wherein the spreading of the foaming raw material is performed by the foaming start time.

7. The method for manufacturing a headrest according to claim 1, wherein, as the injection-passage-forming member, a member that is a functional part composed of at least any one of a shock absorbing member, an acoustic mechanism, and a position adjusting mechanism, and is formed with the foaming raw material injection passage in a substantially center part of the injection-passage-forming member, is used.

8. The method for manufacturing a headrest according to claim 7, wherein, as the shock absorbing member, a member that is formed by a bead foam is used.

9. A headrest manufactured by a method for manufacturing a headrest according to claim 1.

10. A headrest comprising a skin member and a pad layer that are supported by a headrest frame, and are provided by integrally foaming, the headrest having in the inside a functional part supported by the headrest frame, the functional part including in a front surface side of the functional part, a head part supporting plate that is supported by an elastic member, and is supported so as to be elastically displaced in a substantially front and back direction, and the pad layer being provided in a gap between the functional part including the head part supporting plate and the skin member.

11. The headrest according to claim 10, wherein the elastic member is composed of a leaf spring supported by the functional part, and the head part supporting plate is connected to the leaf spring in a middle position in the vertical direction of the head part supporting plate, can be elastically displaced in a substantially front and back direction, and can elastically swing front and back around the leaf spring depending on a way of load application.

12. The headrest according to claim 10, wherein the functional part includes at least any one of a shock absorbing member, an acoustic mechanism, and a position adjusting mechanism.

13. The headrest according to claim 12, wherein the shock absorbing member is formed of a bead foam.

14. The headrest according to claim 12, wherein, when the functional part is an acoustic mechanism, the functional part has: right and left enclosures of which openings are supported in the headrest frame with predetermined intervals, and right and left speakers that include speaker units that are installed in the enclosures, respectively; and a net member that extends from the opening of one of the enclosures to the opening of the other of the enclosures, and covers each of the openings, the head part supporting plate is installed in a front surface of a center part that locates in between right and left sound transmission parts that correspond to the openings, respectively, in the net member, and the center part of the net member is filled with form that is foam molded by intrusion of the foaming raw material, and the functional part includes a function of preventing or blocking interference between sound output from the right and left speaker units due to propagation of the sound in the center part.

* * * * *